United States Patent
Kydles et al.

(10) Patent No.: US 8,407,512 B2
(45) Date of Patent: Mar. 26, 2013

(54) APPARATUS FOR PLUGGING INTO A COMPUTATION SYSTEM, AND COMPUTATION SYSTEM

(75) Inventors: Jens Kydles, Nürnberg (DE); Markus Walter, Bamberg (DE)

(73) Assignee: Siemens AG, Munich (DE)

( * ) Notice: Subject to any disclaimer, the term of this patent is extended or adjusted under 35 U.S.C. 154(b) by 260 days.

(21) Appl. No.: 12/849,504

(22) Filed: Aug. 3, 2010

(65) Prior Publication Data
US 2011/0035524 A1 Feb. 10, 2011

(30) Foreign Application Priority Data
Aug. 4, 2009 (EP) .................................. 09167134

(51) Int. Cl.
*G06F 1/00* (2006.01)
*G06F 13/00* (2006.01)
(52) U.S. Cl. ........ 713/500; 710/300; 710/301; 710/302; 713/501; 713/502
(58) Field of Classification Search .......... 710/300–302; 713/500–502
See application file for complete search history.

(56) References Cited

U.S. PATENT DOCUMENTS

| | | | |
|---|---|---|---|
| 7,269,464 B2* | 9/2007 | Phillips et al. | 700/18 |
| 7,284,149 B1* | 10/2007 | Fisher et al. | 714/5.1 |
| 7,426,590 B2* | 9/2008 | Amrhein et al. | 710/62 |
| 7,487,075 B2* | 2/2009 | Martin et al. | 703/13 |
| 7,565,660 B2* | 7/2009 | Martin | 719/310 |
| 7,805,725 B2* | 9/2010 | Schaftlein et al. | 718/104 |
| 8,121,740 B2* | 2/2012 | Yang et al. | 700/292 |
| 2004/0134992 A1 | 7/2004 | Guez et al. | |
| 2007/0266256 A1 | 11/2007 | Shah et al. | |
| 2008/0172336 A1* | 7/2008 | Srinivasan | 705/51 |
| 2009/0193153 A1* | 7/2009 | Thanos | 710/11 |
| 2010/0023777 A1* | 1/2010 | Prevost et al. | 713/180 |
| 2010/0268356 A1* | 10/2010 | Schenk et al. | 700/79 |
| 2010/0299457 A1* | 11/2010 | Johnson | 710/13 |
| 2011/0185217 A1* | 7/2011 | Eyermann et al. | 713/502 |

FOREIGN PATENT DOCUMENTS

| | | |
|---|---|---|
| CN | 1748222 | 3/2006 |
| CN | 101444063 | 5/2009 |

OTHER PUBLICATIONS

Siemens—"SIMATIC Controllers—The innovative solution for all automation tasks"; 100 pages, Dated Apr. 2008.*
Siemens—"SIMATIC PC Adapter USB Manual"; 38 pages, Dated Oct. 2007.*
SecuTech—"UniKey Time"; 2 pages, Dated 2011.*
PRWeb—"KEYLOK Announces Memory Enhancement of KEYLOK Fortress DONGLE"; 2 pages, Dated May 20, 2009.*
KEYLOK—"KEYLOK Fortress"; 5 pages, Dated 2011.*
RAMTRON—"RTC Oscillator Guide"; 2 pages, Dated Nov. 2003.*

* cited by examiner

*Primary Examiner* — Brian Misiura
(74) *Attorney, Agent, or Firm* — Cozen O'Connor

(57) ABSTRACT

An apparatus for upgrading a standard PC system to a fail-safe computation system, comprising a plug device for plugging into the computation system, a memory module, a microcontroller, and a first device for generating a first time signal, wherein the microcontroller and the first device interact such that the computation system is provided with the first time signal through the plug device device.

13 Claims, 1 Drawing Sheet

APPARATUS FOR PLUGGING INTO A COMPUTATION SYSTEM, AND COMPUTATION SYSTEM

BACKGROUND OF THE INVENTION

1. Field of the Invention

The present invention relates to safety-oriented controllers and, more particularly, to an apparatus for expanding a computation system with software for simulating a programmable logic controller for controlling safety critical applications.

2. Description of the Related Art

Hardware and software programmable logic controllers must be configured according to the requirements of the EN 61508 standard, such that they comply with functional safety requirements. In the case of safety-related systems, such as programmable logic controllers (PLCs) for critical processes, which contain electrical, electronic or programmable electronic components and the failure of which signifies a decisive risk to humans or the environment, these must be configured to particularly ensure safety. The following are exemplary applications which require an increased level of safety: nuclear power stations, control technology for systems of safety-related importance, railway applications, telecommunications technology, signaling and data processing systems, chemical processes or else, for example, small systems such as a punch for punching out sheet metal parts.

In addition to conventional programmable logic controllers, which are configured, for example, as a structural unit having a special system structure for controlling an industrial process, there are also software PLCs, i.e., programmable logic controllers which are simulated using software. Such a software PLC comprises, for example, a PC, preferably an industrial PC and, more particularly, a PC with input/output modules or a field bus expansion for connecting peripherals from the industrial process, such as over a Profibus or Profinet.

If such a software PLC is used to control one of the above-mentioned safety-critical systems, the hardware and software that is used must comply with the safety requirements as set forth in the EN 61508 standard. This standard represents requirements for possible faults and failures which have to be detected or analyzed during operation to determine the proportion of non-critical failures. In order to achieve a high fault discovery level, it may be necessary for a second independent time base to be additionally available in addition to a system clock which is provided by a computation system. If the designer of a control system for an industrial process now wishes to use a standard PC with a software PLC, he is subject to hardware dependence because of different PC systems and is restricted in his use of a standard PC system with a corresponding programmable logic software controller.

SUMMARY OF THE INVENTION

It is therefore an object of the present invention to provide an apparatus for expanding a computation system with software to simulate a programmable logic controller in a simple way to form a computation system for controlling safety-critical applications.

This and other objects and advantages are achieved in accordance with the invention by providing an apparatus comprising a plug-in device for plugging into a computation system, and a memory module, where the memory module is connectable to a bus system of the computation system through the plug device. The apparatus further comprises a first device for generating a first time signal and a microcontroller that interacts within the apparatus such that the computation system is provided with the first time signal through the plug device. In order to increase the fault discovery level, there now exists, for a computation system for a safety-critical process, an additional time base, which is independent of the time base in the computation system, in addition to a system-related time base which is generated inside the computation system.

Here, the microcontroller is configured to provide fail-safe software, which is executable on the computation system and is intended to control an industrial process, with a time base which is independent of the computation system. The apparatus is used to provide an additional safety module which generates an independent time base and provides the computation system with the independent time base independently of its own time base from the microcontroller. The hardware requirements for a fail-safe software PLC for controlling a safety-critical process can thus be advantageously met by plugging the additional safety module into any desired PC, for example.

In an embodiment, the first device for generating the first time signal advantageously comprises a crystal oscillator.

In another advantageous embodiment, the apparatus in accordance with invention has a second device for generating a second time signal. Reliability for use in a safety-critical process is increased further by providing a second, additional time base in the apparatus. The second device for generating a second time signal, which preferably comprises a real-time clock, results in independence from the formation of a second time base usable with the existing PC components of the computation system. In the case of a system management interrupt (SMI) inside the computation system, for example, the reliability is increased because these system management interrupts now have no effect on the time signals due to both time signals being generated independently of the computation system.

In another embodiment of the apparatus, a protection device is provided for encrypting at least the first time signal. Fail-safe software installed on the computation system would therefore require a plugged apparatus which precisely provides this encrypted time signal. Unauthorized copying of the fail-safe software could thus become obsolete because this fail-safe software cooperates only with the encrypted time signal from the apparatus.

In order to make it possible to use the fail-safe software only with the apparatus which has been plugged into the computation system, the apparatus also has a reading device for reading a licensing key. This reading device then provides, for the software on the computation system, a license code which is cyclically interrogated in the software, or the device is configured such that it interrogates a code from the software.

In one particularly preferred embodiment, the plug-in device comprises a USB connection. The USB standard is by now present in any computer system and, in order to supplement the fail-safe system, the apparatus can be easily plugged into the computation system through a PC interface which comprises a USB connection. Other interfaces provided by the computer system are likewise conceivable.

Handling of such an apparatus is considerably enhanced if this apparatus has a compact robust housing.

The memory module has advantageously already been loaded with software for a PC-based programmable logic controller. Here, the software needed for the software PLC can be completely stored in the memory module of the apparatus and can also be delivered therewith. Consequently delivery of the software by an additional data storage medium, such as a DVD, has become superfluous. In the future, a "safety stick for PCs" could therefore be offered as an expansion module. This expansion module contains the second independent time base in accordance with the requirements of the EN61508 standard, as well as the necessary software. This "safety stick" could also comprise the necessary license key, as well as an encryption mechanism for the time signal. In addition to complying with the safety technology standard, know-how protection for the software stored on the "safety stick" is also additionally achieved.

The object mentioned at the outset is likewise achieved by a computation system comprising a safety-related control system for an industrial process, comprising software for simulating a programmable logic controller with a plugged apparatus. The computation system preferably has a connecting device for connecting peripherals as can be found in the industrial process. This connecting device is preferably configured for connection to a field bus, such as a Profibus or a Profinet.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is explained in more detail in the following by an exemplary embodiment and on the basis of the drawings, in which.

DETAILED DESCRIPTION OF THE PREFERRED EMBODIMENTS

Figure 1:
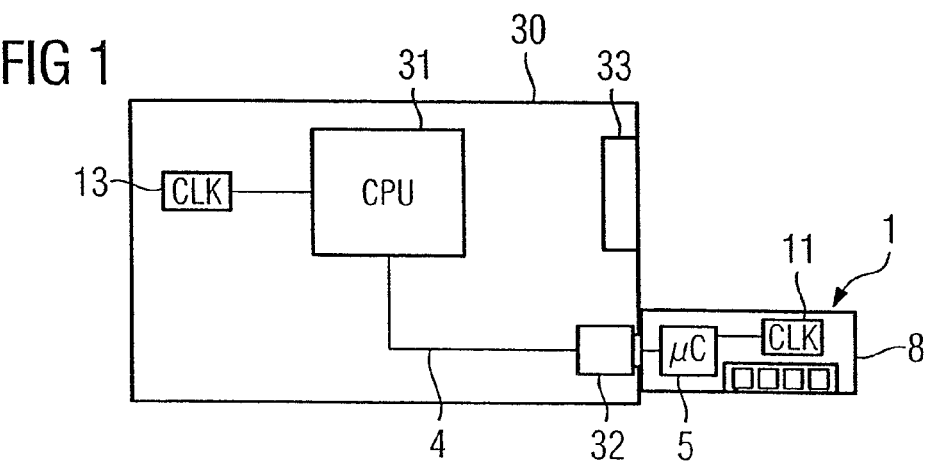
FIG. 1 is an illustration of a computation system with a plugged-in safety apparatus in accordance with an embodiment of the invention.

FIG. 1 is an illustration of a computation system 30 for controlling a safety-critical system of an industrial process. Possible peripherals of the industrial process are connected through an interface 33. The computation system 30 has a processor 31. In the exemplary embodiment, the computation system 30 is a standard PC. The processor 31 is the CPU associated with the standard PC. This CPU is connected to a system crystal 13 of the standard PC. Furthermore, the CPU is connected to a PC interface 32 by a bus system 4. This PC interface 32 comprises a USB interface. An apparatus 1 is plugged into the PC interface 32.

Figure 2:
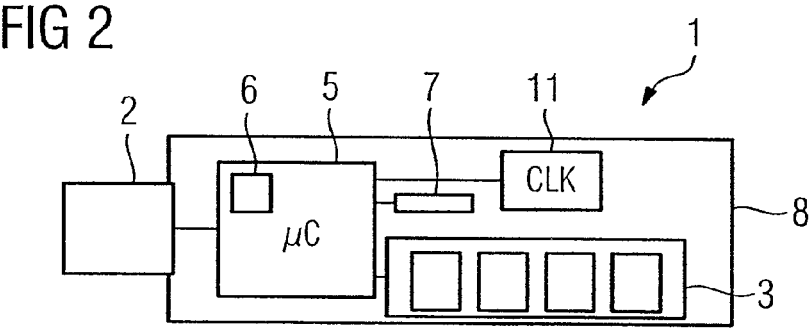
FIG. 2 is an illustration of an apparatus having a first device for generating a first time signal in accordance with the invention.
Figure 3:
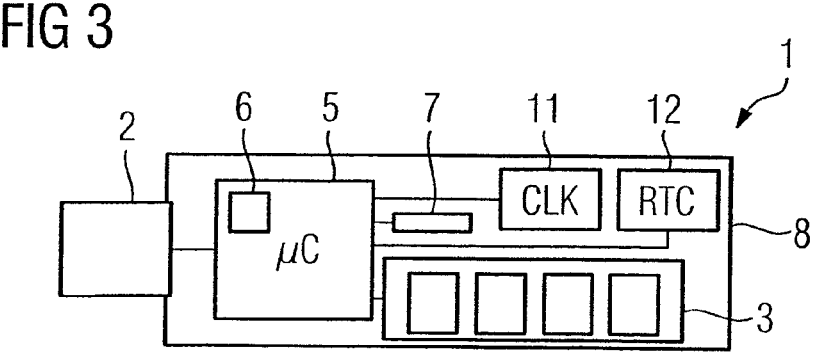
FIG. 3 is an alternative embodiment of the apparatus of FIG. 1, additionally having a second device for generating a second time signal.

As described in even more detail using FIGS. 2 and 3, the apparatus 1 has a first device 11 for generating a first time signal. In the apparatus 1, the first device 11 is used to provide a time base that is independent of the system crystal 13 of the computation system 30. The USB interface or the PC interface 32 of the CPU and thus the fail-safe software, which is installed on the computation system 30 and is intended to simulate a safety-oriented programmable logic controller, are provided with this time base by a microcontroller 5. As a result, standard PC hardware becomes suitable for safety-oriented use in an industrial process without further requirements which are relevant to fail-safety.

FIG. 2 is an illustration of the apparatus 1 in more detail. The apparatus 1 has a plug-in device 2 for plugging into the computation system 30. The plug-in device 2 preferably comprises a USB connector, but it would likewise be conceivable to configure this plug-in device 2 for a PCI bus, SCSI, Firewire or else in such a manner that the plug-in device includes a WLAN transmitter and is plugged into the computation system 30 only for the purpose of mechanical fastening.

In essence, the apparatus 1 has a stable, robust, acid-resistant housing 8 which is configured, in particular, for the harsh environmental conditions in an industrial process. A microcontroller 5 is arranged inside this housing 8. The microcontroller 5 is connected to the first device 11 for generating the first time signal over a data line. The microcontroller 5 is also connected, over a further data line, to a reading device 7 for reading a license key. The reading device 7 can thus be used for know-how protection. In order to improve possible know-how protection, a protection device 6 is integrated inside the microcontroller 5. The protection device 6 is configured to encrypt the first time signal so that additional protection is provided. The reading device 7 and the protection device 6 can operate and can be arranged both together and independently of one another.

A memory module 3 provides sufficient storage space for accommodating the software for simulating a programmable logic controller.

FIG. 3 is an illustration of another exemplary embodiment of the apparatus. In contrast to the embodiment depicted in FIG. 2, the apparatus 1 of the presently contemplated embodiment includes a second device 12 for generating a second time signal. The second device 12 is likewise connected to the microcontroller 5 over a corresponding data line. In one advantageous embodiment, the first device 11 comprises a clock CLK, i.e., a crystal oscillator 13 for the microcontroller 5, and the second device 12, as an additional time base, comprises a real-time clock (RTC).

Consequently, the system crystal 13, which is conventionally present in any PC system, is no longer needed when using the apparatus of FIG. 2, and hardware independence from the PC system used is thus increased further.

Another advantage is that, in the case of PC systems in which the system clock is reduced for energy reasons, the second time base of the apparatus 1 is not affected by this reduction. A stable, additional diverse time base is thus ensured even if the clock for the CPU of the computation system 30 is reduced with regard to an energy-saving mode of the computation system 30.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An apparatus comprising:
   a plug-in device for plugging into a computation system;
   a memory module connectable to a bus system of the computation system by the plug-in device;
   a microcontroller configured to provide fail-safe software, which is executable on the computation system and controls an industrial process, with a time base which is independent of the computation system; and
   a first device configured to generate a first time signal, the microcontroller and first device being connected to interact such that the computation system is provided with the first time signal through the plug-in device.

2. The apparatus as claimed in claim 1, wherein the first device comprises a crystal oscillator.

3. The apparatus as claimed in claim 1, further comprising:
   a second device configured to generate a second time signal.

4. The apparatus as claimed in claim 2, further comprising:
   a second device configured to generate a second time signal.

5. The apparatus as claimed in claim 3, wherein the second device comprises a real-time clock (RTC).

6. The apparatus as claimed in claim 1, further comprising:
   a protection device configured to encrypt at least the first time signal.

7. The apparatus as claimed in claim 1, further comprising:
   a reading device configured to read a licensing key.

8. The apparatus as claimed in claim 1, wherein the plug-in device comprises a USB connection.

9. The apparatus as claimed in claim 1, further comprising a compact housing.

10. The apparatus as claimed in claim 1, wherein the memory module includes software for a PC-based programmable logic controller.

11. A computation system for an industrial process, comprising:
    a module for simulating a programmable logic controller; and
    an apparatus comprising:
    a plug-in device for plugging into a computation system;
    a memory module connectable to a bus system of the computation system by the plug-in device;
    a microcontroller; and
    a first device configured to generate a first time signal, the microcontroller and first device being connected to interact such that the computation system is provided with the first time signal through the plug-in device.

12. The computation system as claimed in claim 11, wherein the computation system comprises a standard Personal Computer (PC).

13. The computation system as claimed in claim 11, wherein the computation system comprises a safety-related control system.

* * * * *